Aug. 9, 1932.  N. NASTROM  1,870,741
EGG BREAKER
Filed July 9, 1930   2 Sheets-Sheet 1
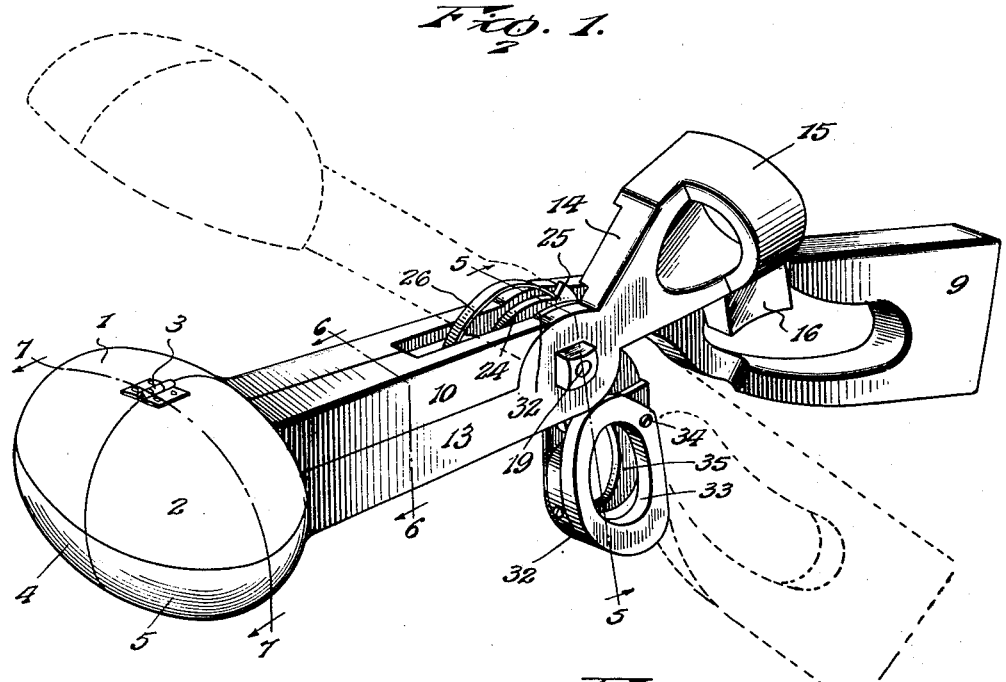
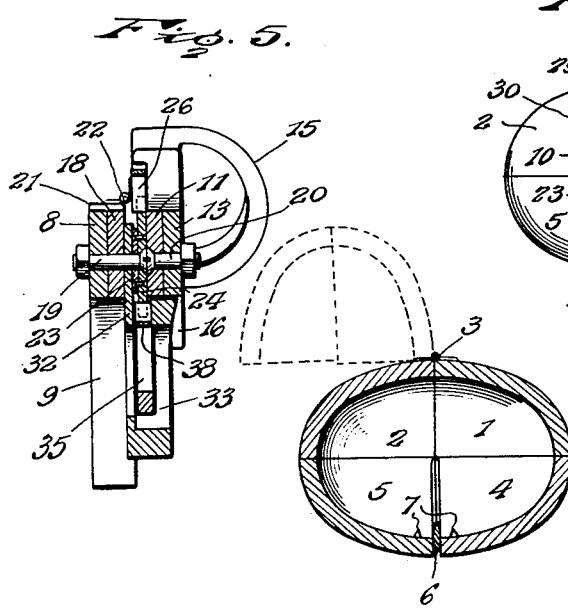
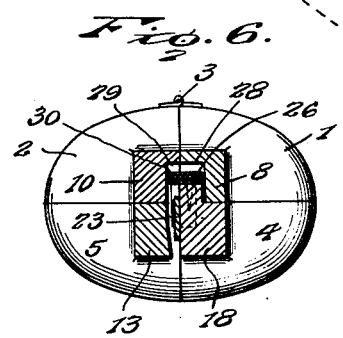
Inventor
Nels Nastrom
By Lacey & Lacey, Attorneys Aug. 9, 1932.    N. NASTROM    1,870,741
EGG BREAKER
Filed July 9, 1930    2 Sheets-Sheet 2

Patented Aug. 9, 1932

1,870,741

UNITED STATES PATENT OFFICE

NELS NASTROM, OF ELK MOUNTAIN, WYOMING

EGG BREAKER

Application filed July 9, 1930. Serial No. 466,823.

The object of this invention is to provide a tool by the use of which an egg shell may be split or cracked so that the meat of the egg may be discharged into a pan or other receptacle without loss of any of the meat and without any spattering of any portion of the same upon adjacent objects or upon the person of the user. The invention provides a device which will completely enclose an egg and in which by a very simple operation the shell will be split medially and then the meat of the egg discharged while retaining the shell within the egg-holding elements and without portions of the shell being driven into the contents thereof. The invention is illustrated in the accompanying drawings and will be hereinafter fully described, the novel features being subsequently particularly defined in the appended claims.

In the drawings:

Figure 1 is a perspective view of a utensil embodying the present invention showing the same as it appears when housing an egg in full lines and in dotted lines the relative positions of the parts as they are about to clasp the egg, Fig. 2 is a view in side elevation and partly in section showing the device as it appears when about to discharge the contents of the egg shell, Fig. 3 is a view in side elevation showing the parts of the device which appear in edge view in Fig. 2, Fig. 4 is a side elevation, partly in section, of the parts which appear in the lower portion of Fig. 2 but showing the knife in a different position, and Figs. 5, 6 and 7 are detail sections taken respectively on the lines 5—5, 6—6 and 7—7 of Fig. 1.

The egg-holding elements of this utensil are so formed as to define upper and lower mating egg-holding cups each of which is split transversely at its middle whereby there are four quarters defined, the upper cup consisting of the sections 1 and 2 which are connected at the center of their meeting edges by a hinge 3 and the lower cup consisting of sections 4 and 5 which are not connected directly to each other but are so mounted as to fit closely together and against the upper cup whereby an egg may be completely enclosed. The several edges of these cup sections are adapted to fit closely together, as shown most clearly in Figs. 6 and 7, except that the meeting edges of the sections 4 and 5 are slightly spaced, as shown in Fig. 7, to accommodate the cutter 6, and on the inner surfaces of said sections, immediately adjacent the meeting edges, are spurs 7 which are adapted to enter the shell of an egg disposed within the cup so that after the shell is split and the holder is opened to discharge the meat of the egg the sections of the shell will be retained within the holder and may be subsequently removed so that no portion of the same will pass into the meat. The section 1 of the upper cup is formed integral with a frame member or bar 8 which extends rearwardly and somewhat downwardly and at its rear end is shaped to form a handle 9 which may be conveniently grasped by the hand of the user and the section 2 of the upper cup which is hinged to the section 1 is formed integral with a frame bar or member 10 which extends rearwardly from the cup section and is adapted to lie alongside of the frame bar or member 8. The bars 8 and 10, however, are not connected but are free of each other throughout, except for the hinge 3 which connects the cup sections. The rear end of the bar 10 is formed into a circular ear 11 which fits within a recess 12 provided therefor in a frame bar 13 and is pivoted to said bar which extends from the cup section 5 and the rear end of which is offset, as shown most clearly in Fig. 3, and extends beyond the end of the bar member 10, as shown at 14, said rear extension 14 projecting normally upwardly above the handle member 9 and having a thumb eye or ring 15 formed at its extremity. A lug or knob 16 is formed at the base of the thumb ring or eye 15 against which the thumb may be pressed at certain stages in the operation of the device. The frame bar 8 is recessed, as indicated at 17, in the forward portion of the handle 9 to accommodate the rear portion of a frame bar 18 which extends rearwardly from the cup section 4 and is pivoted to the bar 8 by a pivot screw or bolt 19 which is arranged in axial alinement with the pivot screw or bolt 20 connecting the frame members 10 and 13. The rear extended portion 21 of the bar 18 is adapted to rest upon the base of the recess 17 so that the cup sections 1 and 4 will be properly limited in their movement toward each other and not be broken or bent or be permitted to engage the egg with such force as to break the same, and the extremity of the extension 21 is connected with the rear end of the bar member 13 by a hinge 22 which is secured to the side of the thumb ring 15 and to the top edge of the extension 21. This hinge 22 is arranged in alinement longitudinally of the device with the hinge 3 so that the cup sections 1 and 2 with the frame members of the device may move hingedly with respect to each other when an egg is to be discharged and when these cup sections 1 and 2 are thus relatively moved the cup sections 4 and 5 will respectively retain their relations to the sections 1 and 2. By properly manipulating the handle member 9 and the thumb ring 15, the lower cup consisting of the sections 4 and 5 may be pivotally moved about the pivots 19 and 20 as an entirety relative to the upper cup consisting of the sections 1 and 2, this manipulation being effected when an egg is to be taken up by or put within the holder.

The knife 6 has an arcuate blade adapted to fit between the cup sections 4 and 5 and conforming to the transverse outline of the same so that it will readily engage and penetrate the egg shell to split the same, said blade being formed at the free end of a shank 23 which is adapted to lie between the frame members 13 and 18 and is secured at its rear end to a trip 24 fitted loosely on the pivot bolt 19. Said trip 24 is provided with a shoulder 25 at a high point on its edge which is engaged by a spring 26 secured upon a lug 27 formed on the member 18 and accommodated within a recess 28 provided therefor in the inner side of the member 8, the member 10 being also provided with a recess 29 to further accommodate the spring and the shank of the knife. As shown most clearly in Figs. 2, 4 and 6, the forward portion of the spring 26 is reinforced and bears upon the upper edge of the member 18 within a recess 31 therein and is secured upon the lug 27 by a clamping plate 30 and the clamping plate projects over the edge of the member 18 so as to form a stop against which the shank of the knife may impinge to limit the upward movement of the same. A trigger 32 is mounted upon the pivot bolt 19 and depends below the same and the trip 24 and has an opening formed transversely therethrough, as shown at 33, within which the finger of the operator may be engaged. Pivotally mounted within the trigger adjacent the rear edge thereof, as at 34, is a dog 35 which is so shaped that the operator's finger inserted through the opening 33 may bear against the same below the pivot and thereby rock it so that it will be inoperative. The upper portion of this dog extends forwardly below the trip 24 and is formed at its front end with an upstanding tooth or lug 36 which is adapted to engage a cooperating tooth or lug 37 on the lower edge of the trip, as shown in Figs. 2 and 4, and is normally held yieldably in such engagement by a leaf spring 38 secured upon the front side of the trigger and bearing against the under edge of the forwardly extending portion of the dog. When the knife is to be operated, the trigger 32 is rocked rearwardly, as shown in Fig. 4, by pressure exerted through the fingers of the operator and the dog will, of course, move with the trigger, the movement being transmitted to the cutter through the engagement of the teeth or lugs 36, 37 in an obvious manner. When the trigger is thus rocked rearwardly, the spring 26 is placed under increased tension, as will be understood upon reference to Figs. 2 and 4, and eventually the increased tension of said spring will overcome the spring 38 so that the trip will be returned to the position shown in Fig. 2 and the knife will be swung to its place between the cup sections 4 and 5 with a snapping action which will carry it into sharp contact with the egg shell so that a clean crack or split will be made in the shell extending entirely around the same. It may sometimes be desired to rock the trigger without actuating the knife and if the finger of the user be then inserted through the opening 33 of the trigger it will bear upon the pendent portion of the dog and will rock the same so that the lug 36 will release the lug 37 and, consequently, the knife will remain inactive, although the trigger is rocked rearwardly.

In use, the handle member 9 is gripped within the hand of the user and the user's thumb may be inserted within the eye or loop 15. To bring the cups into the position indicated by the relative full and dotted lines in Fig. 1, the operator will engage his thumb under the knob or lug 16 and press upwardly against the same, whereupon the members 13 and 18 will move relatively downwardly to separate the cups and permit the insertion of the egg. The movement of the cup sections 1 and 2 upwardly relative to the cup sections 4 and 5 is due to the fact that the hinges 3 and 22 connect said cup sections 1 and 2 and the frame members 13 and 18 and the said hinges are at opposite sides of the pivot bolts 19 and 20 so that the upward movement imparted to the lug or knife 16 by the pressure of the thumb necessitates a corresponding movement of the frame member 13 and also results in the members 8 and 10 retaining their relative positions. After the egg has been housed within the two cups, the parts are restored to the position shown in full lines in Fig. 1 and the operator then presses upon the trigger 32 to rock the same downwardly, whereupon the previously described movement of the knife will be effected. After the shell has been split by the action of the knife, the operator exerts an upward force through his thumb engaged in the ring or loop 15 and this action will result in a rocking of the members 10 and 13 away from the members 8 and 18 about the hinges 3 and 22. It will be noted that the lug 16 is disposed below the line of division between the two cups which line extends through the pivots while the thumb ring 15 is disposed above said line and, consequently, an upward movement exerted through the lug 16 will cause the cup sections 4 and 5 to swing relatively downward while an upward movement exerted through the top of the ring 15 will be active above the line of the hinges and will, consequently, cause the cup sections 2 and 5 to move together away from the cup sections 1 and 4 without being themselves separated. The latter movement will permit the meat of the egg to be discharged while the shell will be retained within the cup sections by the spurs 7.

The tool embodying my invention and herein described is very compact and easily manipulated and will enable eggs to be very readily and cleanly cracked for discharge of the contents of the shell. When an egg is to be fried, it may be placed within the holder and the device manipulated as described to crack the shell when by holding the device close to the bottom of the frying pan the meat of the egg may be dropped into the pan without spreading and without spattering grease. A hot boiled egg may be taken up by the cup without being directly handled with the fingers and the shell cracked so that the meat may be placed within an egg cup or other receptacle readily and without soiling the cup or any adjacent objects and without subjecting the hand of the user to possible burning or scalding.

Having thus described the invention, I claim:

1. An egg breaker comprising a holder consisting of two cups adapted to enclose an egg and each bisected transversely, a knife movable between and independently of the sections of one cup to split the shell of an egg held in the cups, means whereby the cups may be moved apart to receive the egg, and means whereby the members of the cups may be moved apart to discharge the meat of the egg and retain the shell.

2. An egg breaker comprising upper and lower cups adapted to house an egg and each bisected transversely, the sections of one cup being hingedly connected and the corresponding sections of the two cups being pivotally connected to rock in a plane at an angle to the plane of relative movement of the hingedly connected cup sections whereby the two cups may move apart to receive an egg and the sections of the two cups may move apart to discharge the meat of an egg and retain the shell, and a knife movable between and independently of the sections of the lower cup, to split the shell of the egg.

3. An egg breaker comprising a pair of cups each bisected transversely, a knife movable between the sections of one cup to break the egg, frame members extending from each of the cup sections, a hinge connecting the sections of one cup, a second hinge alined with the first hinge and connecting the frame members extending from the sections of the other cup, and pivots passing through and connecting the frame members extending from corresponding sections of the two cups the hinges being at opposite sides of the pivots and both disposed above a line passing between the cups and through said pivots.

4. An egg breaker comprising a pair of cups adapted to house an egg and each bisected transversely, a knife movable into one cup to break the egg, frame members extending from each section of each cup, the frame members extending from corresponding cup sections being pivoted together and the frame members extending from the lower cup sections being hinged together at the rear of the pivots, a hinge connecting the sections of the upper cup, a handle member at the rear end of the frame member extending from one of the upper cup sections, and a thumb ring at the rear end of the frame member extending from one of the lower cup sections.

5. An egg breaker comprising a pair of cups adapted to enclose an egg and each bisected transversely, a frame member extending from each cup section, the frame members on the same side of the division in the cup being pivoted together, means whereby the cups may be moved apart or together about said pivotal connections, means whereby the corresponding sections of the two cups may be moved apart or together, a knife mounted upon the pivotal connection between two of the frame members and playing between the sections of the lower cup, and a trigger suspended upon said pivotal connection and operatively connected with the knife.

6. An egg breaker comprising upper and lower cups adapted to enclose an egg and each bisected transversely, frame members extending from the sections of the two cups, the frame members at one side of the division in the cups being pivotally connected, a knife suspended on one of the pivotal connections and disposed within the division of the lower cup, a trip secured to the pivoted end of the knife, means engaged with the trip and yieldably holding the knife in raised position, a trigger suspended on the pivotal connection, and operative connections between the trigger and the trip whereby to oscillate the knife.

7. An egg breaker comprising a pair of cups adapted to house an egg and each bisected transversely, a frame member extending from each of the respective cup sections, the frame members at one side of the division in the cups being pivotally connected, a knife disposed within the division of the lower cup and mounted upon one pivotal connection, a trip fixed to the rear end of the knife and mounted on the pivotal connection, a spring disposed between the frame members and engaged with said trip and acting thereon to yieldably hold the knife in raised position, a trigger suspended on the pivotal connection and depending below the trip, and a dog pivotally mounted on the trigger and normally engaged with the trigger whereby upon rocking movement of the trigger the knife will be drawn downward and automatically released to snap against the shell of an egg held in the cups.

In testimony whereof I affix my signature.

NELS NASTROM. [L. S.]